United States Patent [19]
Takahashi et al.

[11] Patent Number: 5,524,274
[45] Date of Patent: Jun. 4, 1996

[54] TRANSCEIVER CONTROLLED BY ABSENCE/PRESENCE OF INPUT SIGNAL

[75] Inventors: Norio Takahashi; Nobuo Sekiguchi, both of Kodaira; Sakari Ohira, Sendai; Fujio Sumi, Tokyo, all of Japan

[73] Assignees: Hitachi Denshi Kabushiki Kaisha, Tokyo; Tohoku Electric Power Co., Inc., Miyagi-ken; Fuji-Tekku Kabushiki Kaisha, Tokyo, all of Japan

[21] Appl. No.: 226,830

[22] Filed: Apr. 13, 1994

[30] Foreign Application Priority Data

Apr. 20, 1993 [JP] Japan .................................. 5-115289

[51] Int. Cl.$^6$ ............................... H04B 1/54; H04J 3/06; H04J 3/18
[52] U.S. Cl. ............................ 455/34.2; 455/83; 455/88; 370/29
[58] Field of Search ................................. 455/72, 73, 79, 455/83, 84, 88, 114, 116, 34.2, 115, 127; 370/24, 29, 31, 80, 81, 100.1

[56] References Cited

U.S. PATENT DOCUMENTS 5,327,461  7/1994  Kushige ..................................... 455/79
5,335,363 10/1994  Takahashi et al. ......................... 455/79

OTHER PUBLICATIONS

"Simultaneous Transmitting and Receiving Method Mobile Radio Using Only One Frequency Channel" *IEICE Spring Conference* Mar. 24, 1992; p. 336.

*Primary Examiner*—Andrew I. Faile
*Attorney, Agent, or Firm*—Antonelli, Terry, Stout & Kraus

[57] ABSTRACT

A transceiver having a transmitting unit and a receiving unit for performing substantially simultaneous communication with another transceiver in both directions by using a single frequency carrier. The transceiver includes a unit for generating a synchronizing signal for alternately switching between a transmission time period and a reception time period of the transceiver at a predetermined period, a signal processing unit for converting an input signal into a compressed signal by compressing a time axis of the input signal by a predetermined ratio, and affixing the synchronizing signal to the compressed signal, a unit for supplying the compressed signal with the synchronizing signal to the transmitting unit during the transmission time period, and a unit for reproducing an original signal from a signal transmitted from the other transceiver and received by the receiving unit during the reception time period, by expanding a time axis of the signal by a predetermined ratio. The transceiver further includes a signal detecting unit for detecting an absence/presence of the input signal and generating an output signal corresponding the absence/presence, and a control unit for controlling the operation of the signal processing unit in accordance with the output signal of the signal detecting unit. The control unit controls operation of the signal processing unit to transmit only a signal related to the synchronizing signal to the other transceiver, when the signal detecting unit generates the output signal representing an absence of the input signal for a predetermined time period.

4 Claims, 4 Drawing Sheets

TRANSCEIVER CONTROLLED BY ABSENCE/PRESENCE OF INPUT SIGNAL

BACKGROUND OF THE INVENTION

The present invention relates to a transceiver using a single carrier frequency for full-duplex transmission.

Two different frequencies are generally required for transceivers to carry out communication simultaneously in both directions. However, a full-duplex transmission using a single carrier frequency so as to efficiently use radio frequencies has been proposed in the paper titled "Simultaneous Transmitting and Receiving Method Mobil Radio Using Only One Frequency Channel", Proceedings of the 1992 IEICE Spring Conference, Paper No. B-769, page 3–336, Mar. 15, 1992.

This method will be described in detail with reference to FIGS. 3 and 4. A voice signal supplied from a voice input unit 1 such as a microphone is amplified and band-limited by an audio amplifier 2. This voice signal is then supplied to a time compressor 3 to undergo signal processing such as a process of compressing time two times or more and a process of assigning a synchronizing signal outputted from a synchronizing signal generator 19 for giving transmission/reception timings. With this transmission/reception timing process, at least the first transceiver sending the voice signal transmits the synchronizing signal in order for the second transceiver receiving the signal from the first transceiver to generate its transmission/reception timings. The time compression approximately doubles the frequency band of the original voice signal. The time compressed voice signal is frequency modulated by a frequency synthesizer. The modulated signal is mixed with a signal supplied from an oscillator 6 by a frequency converter 5 so as to generate a signal having a transmission frequency. This signal is amplified to a sufficient power by a power amplifier 7 and supplied via an antenna switch 8 to an antenna 9 from which it is radiated.

In receiving a signal from the second transceiver, a signal received by the antenna 9 is supplied via the antenna switch 8 to a radio frequency amplifier 10. The amplified reception signal is mixed with a signal supplied from the frequency synthesizer 4 so as to be converted into an intermediate frequency signal which is detected or demodulated by a demodulator 11. Since there is no voice input from the voice input unit 1 during the reception period, the frequency synthesizer 4 does not modulate a voice signal.

The synchronizing signal contained in the detected signal is picked up by a synchronizing signal detector 12 synchronously with transmission/reception timings, and supplied to a controller 13. Synchronously with this synchronizing signal, the controller 13 generates a timing Control signal and supplies it to the time compressor 3, antenna switch 8, oscillator 6, time expander 14, and synchronizing signal generator 19.

In the detected signal, the voice signal having a doubled frequency band passes through the synchronizing signal detector 12 and is expanded to the original signal by a time expander 14 under the control of the controller 13. This signal is then amplified by an audio amplifier 15 and supplied to a voice output unit 16 such as a loudspeaker.

FIG. 4 is a timing chart explaining the operation of the circuit shown in FIG. 3. A voice input signal indicated at (a) undergoes a time compression process and is converted to a time compressed signal indicated at (b). Reference numeral 18 represents a synchronizing signal. This time compressed signal is frequency modulated by a signal generated by the frequency synthesizer 4, and as shown at (d), transmitted at a transmission timing (R representing a reception time period, and T representing a transmission time period) indicated at (c) from the antenna 9. The voice signal indicated at (a) by oblique lines is time compressed and transmitted at the transmission timing as shown at (d). During the reception time period, a signal which is time compressed, modulated, and transmitted by the second transceiver is received in the first transceiver.

As shown at (d) in FIG. 4, the first transceiver transmits a synchronizing signal 18 at the transmission timing, and the transmission/reception timings of the second transceiver are controlled synchronously with the synchronizing signal 18.

With this conventional method, however, even if there is no input signal, a carrier signal is transmitted at a constant time interval synchronously with the synchronizing signal 18 while transmissions and receptions are alternately performed at the constant time interval. There arises therefore a problem of wasteful radio waves and inefficient use of them.

Furthermore, because two transceivers are always transmitting frequency modulated radio waves alternately, even if a third party which can radiate only a weak electromagnetic field tries to intrude into communication between the two transceivers, the third party cannot intrude into it. Still further, because a power consumption of a transceiver is larger during transmission than during reception, the transmission power consumed while there is no voice signal becomes more wasteful.

SUMMARY OF THE INVENTION

A first object of the present invention is to provide a transceiver capable of stopping a transmission operation if there is no input signal during a predetermined time period.

A second object of the present invention is to provide a transceiver capable of ensuring synchronization between a first transceiver and a second transceiver even if the signal is not sent.

A third object of the present invention is to provide a transceiver capable of ensuring an intruding by a third party transceiver.

According to an embodiment of this invention, a transceiver transmitting a synchronizing signal stops its transmission operation a plurality of times consecutively if a voice signal is not detected for a predetermined time period, and a transceiver not transmitting the synchronizing signal stops its transmission operation after a voice signal is not detected for the predetermined time period.

Specifically, when a voice detector detects that a voice input is not detected for the predetermined time period, the transceiver transmitting the synchronizing signal stops its transmission operation while transmitting only synchronizing signals at a predetermined time interval, and the transceiver not transmitting the synchronizing signal stops its transmission operation until a voice input is detected. Accordingly, wasteful radio waves are not transmitted and power consumption is reduced. Furthermore, a third party transceiver can intrude into communication between two transceivers by transmitting an input voice signal with a synchronizing signal.

Other objects and advantages of the present invention will be made apparent as the description progresses.

DESCRIPTION OF THE PREFERRED EMBODIMENTS

Figure 1:
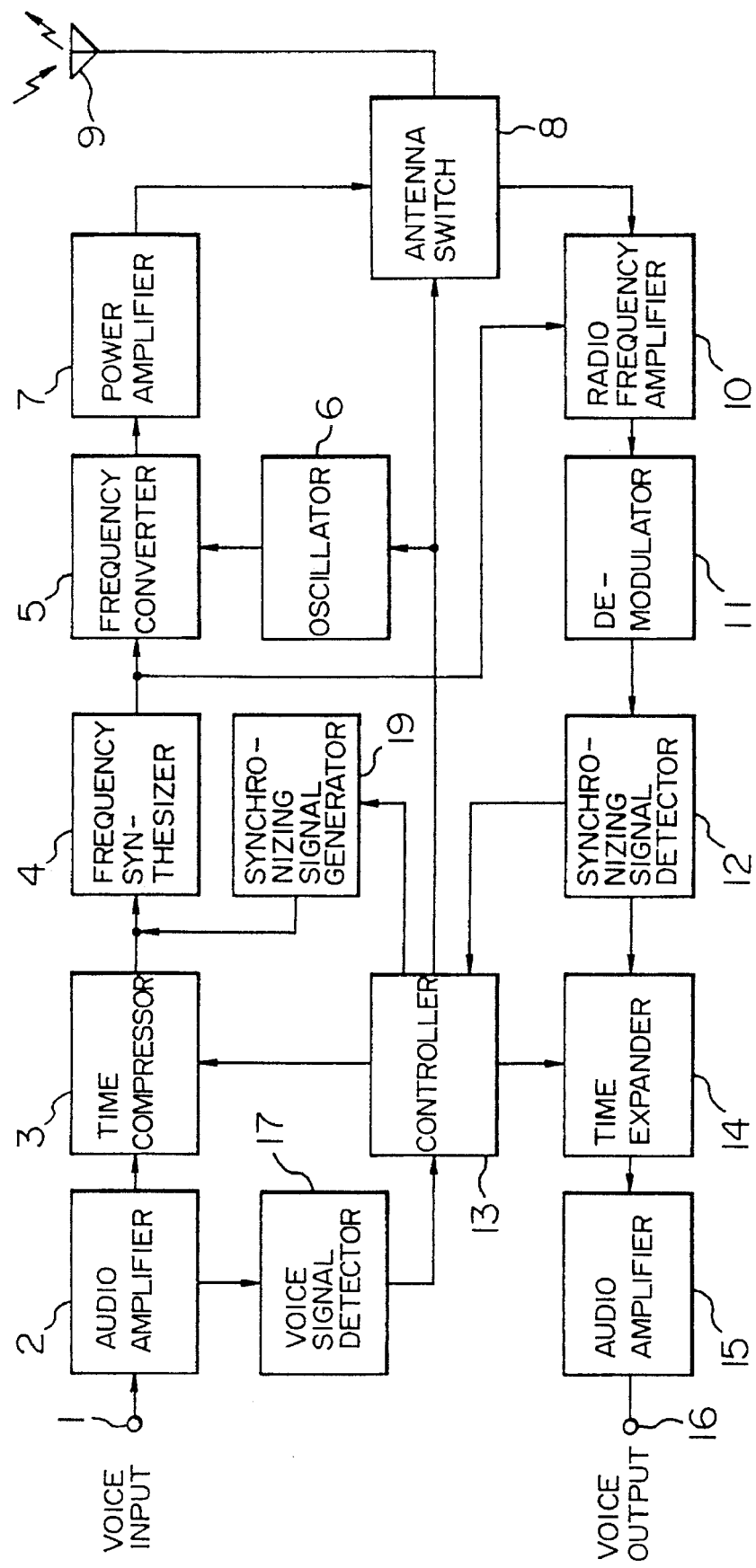
FIG. 1 is a block diagram showing the structure of a transceiver according to an embodiment of the present invention.
Figure 3:
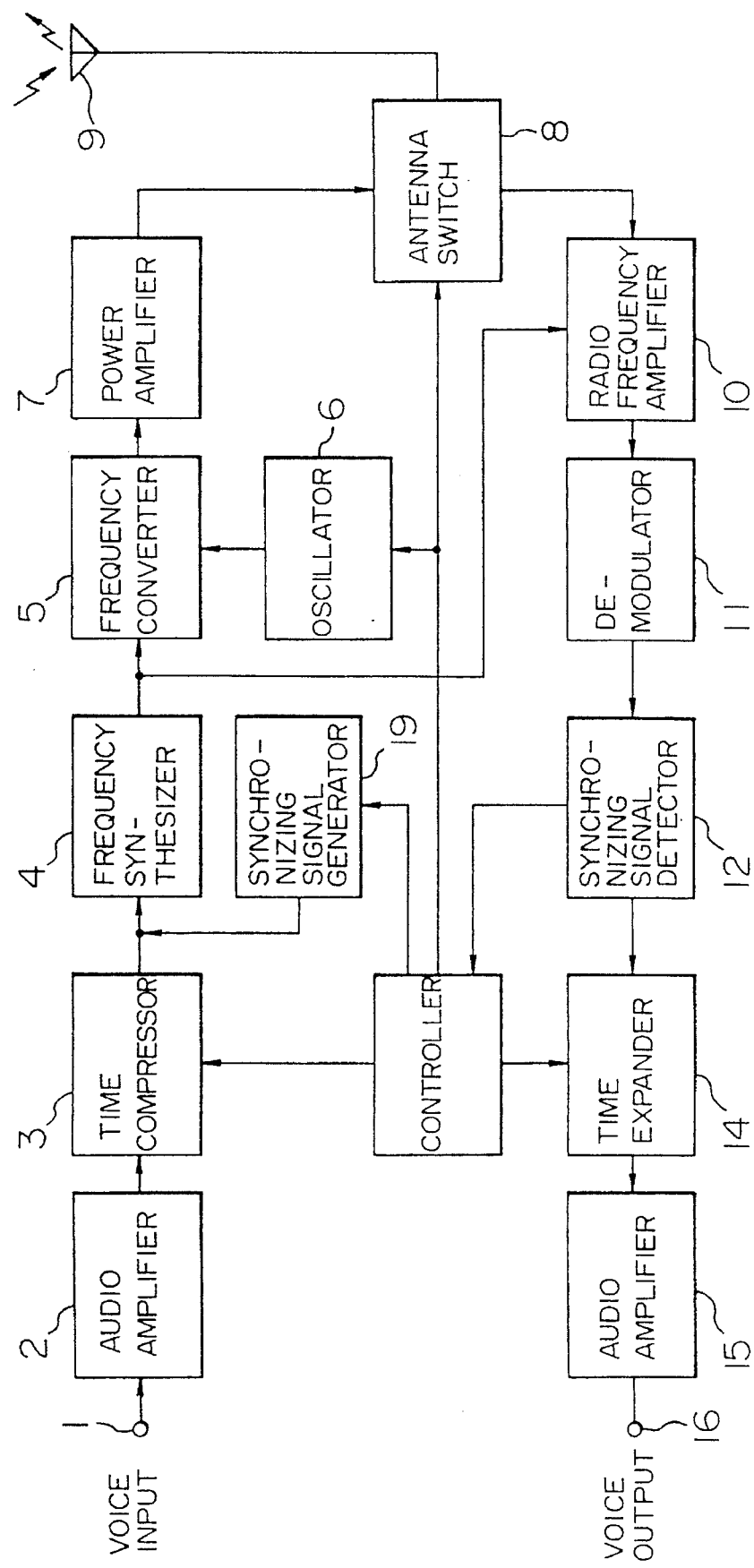
FIG. 3 is a block diagram showing the structure of a conventional transceiver.
Figure 4:
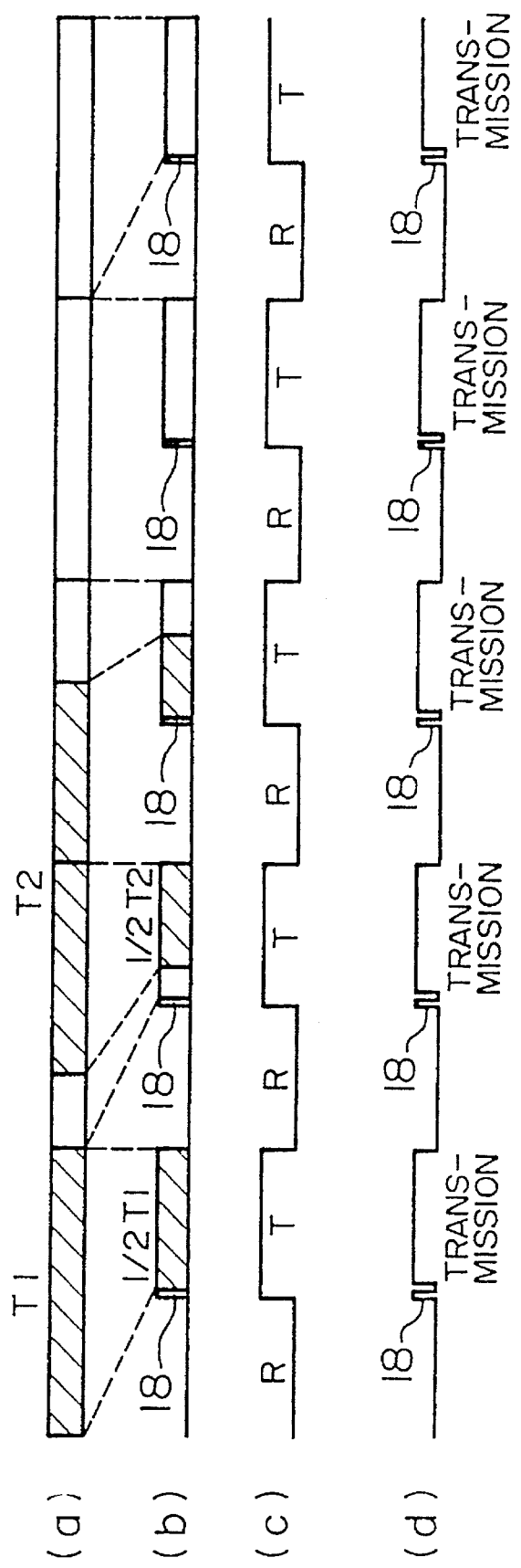
FIG. 4 is a timing chart explaining the operation of the conventional transceiver shown in FIG. 3.

FIG. 1 is a circuit block diagram of a transceiver according to an embodiment of the invention. In FIG. 1, identical reference numerals to those shown in FIG. 3 designate same functional elements, and so the detailed description thereof is omitted.

A voice signal outputted from an audio amplifier 2 is detected by a voice signal detector 17. A threshold level of the voice signal detector 17 for detecting a voice signal is set to a level sufficient for discriminating between noises and a voice signal. If an output of the audio amplifier 2 is the threshold level or less for a predetermined time period, the voice signal detector 17 outputs a low level signal (L indicated at (c) of FIG. 2), whereas if not, it outputs a high level signal (H indicated at (c) in FIG. 2). The predetermined time period as a detection measure is set as desired depending upon the operating conditions of each transceiver. Under normal operating conditions, this time period is preferably one second or longer. In this embodiment, this time period is set to about 10 seconds.

In accordance with an output signal from the voice signal detector 17, a controller 13 controls a time compressor 3, a synchronizing signal generator 19, and an antenna switch 8.

Reception time periods and transmission time periods of the transceiver are alternately exchanged synchronously with a synchronizing signal. When an input voice signal is detected by the voice signal detector 17 during the reception time period, the controller 13 controls the time compressor 3, synchronizing signal generator 19, and antenna switch 8, and transmits the compressed signal and synchronizing signal during the next transmission time period from an antenna 9.

When an input voice signal is detected by the voice signal detector 17 during the transmission time period, the controller 13 controls the time compressor 3, synchronizing signal generator 19, and antenna switch 8, and transmits the compressed signal and synchronizing signal during the current transmission time period from the antenna 9.

On the side of a transceiver transmitting the compressed signal and synchronizing signal, if the voice signal detector 17 does not detect an input voice signal for about 10 seconds during the transmission time period, the controller 13 controls the synchronizing signal generator 19 and antenna switch 8 so as to generate a synchronizing signal having a longer period than that (about 0.4 second) of the normal synchronizing signal and transmit only this synchronizing signal. In this embodiment, this synchronizing signal has a period of 5 seconds. The period of the synchronizing signal is sufficient if it is 2 seconds or longer. Since only the synchronizing signal is transmitted even if a carrier and a voice signal are not transmitted, synchronization of communication between two transceivers can be ensured.

The controller 13 may be made of electronic circuits capable of performing the above-described control function, or may be made of a microcomputer running on a control program executing the above-described control function.

Figure 2:
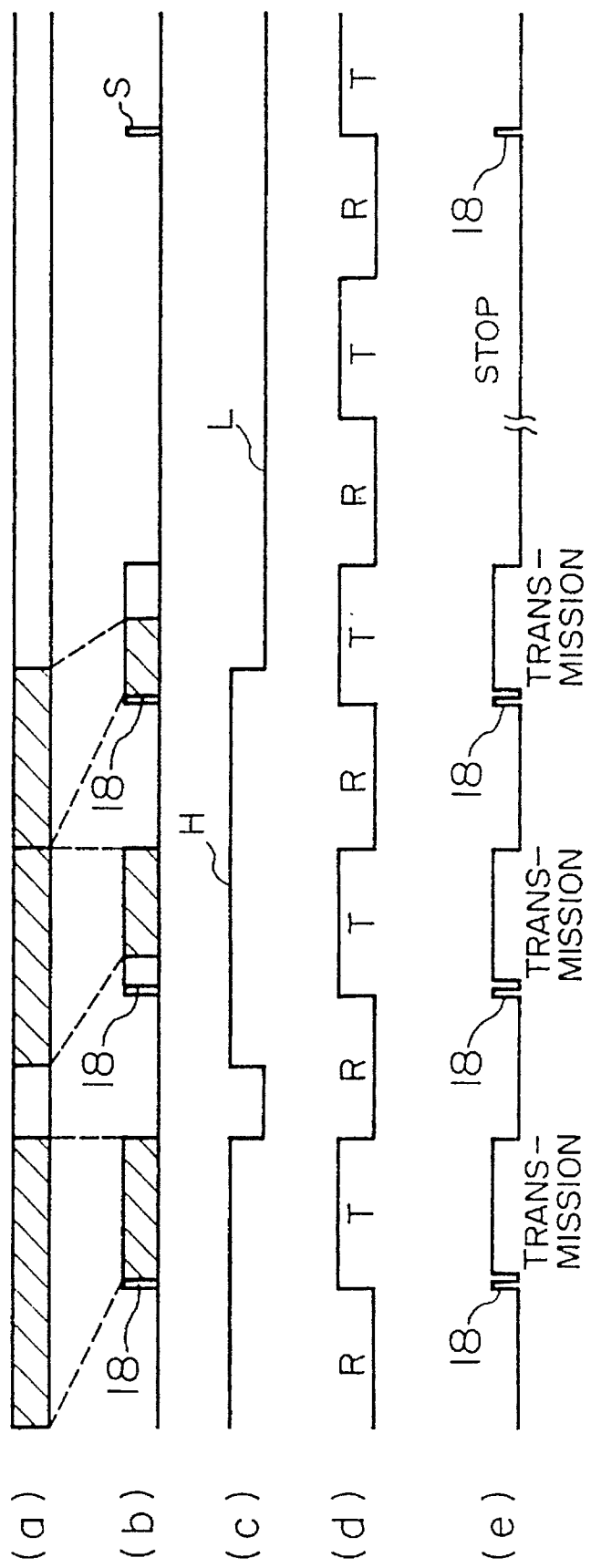
FIG. 2 is a timing chart explaining the operation of the transceiver shown in FIG. 1.

FIG. 2 is a timing chart explaining the operation of the circuit shown in FIG. 1. A voice input signal indicated at (a) in FIG. 2 undergoes a time compression process, in the manner similar to the conventional transceiver. When the voice signal detector 17 detects an input voice signal for the predetermined period during the reception time period, it outputs a high level detection signal H as shown at (c) in FIG. 2 and the controller 13 controls the transceiver in the manner described previously. Specifically, a voice signal is transmitted and received during the period while the voice signal detection signal takes the H level, and the transmission/reception is stopped during the period while the detection signal takes a low level L. The transmission/reception control is therefore conducted by the voice signal detection signal indicated at (c) in FIG. 2 and the transmission/reception timings indicated at (d) in FIG. 2.

When the voice signal detector 17 does not detect an input voice signal, it does not output the voice signal detection signal as shown at (c) in FIG. 2. As a result, even if the transmission/reception timing signals are repetitively generated as shown at (d) in FIG. 2, transmission is not performed as indicated at (e) in FIG. 2 near the second half area thereof, but only the synchronizing signals 18 are transmitted at a time interval of, for example, about 5 seconds.

In the above embodiment, a voice signal has been used. Obviously, the invention is not limited only to a voice signal, but may also be used for general data, or other signals applicable to medical applications may also be used.

As described so far, according to the present invention, during the period while there is no input voice signal, wasteful radio waves are not transmitted while ensuring synchronization between a sender transceiver and a receiver transceiver. Accordingly, radio waves can be used efficiently, an intruding by a third party transceiver can be reliably established, and a power consumption can be reduced.

What is claimed is:

1. A transceiver, having transmitting means and receiving means, for performing substantially simultaneous communication with another transceiver in both directions by using a single frequency carrier, comprising:

means for generating a synchronizing signal for alternately switching between a transmission time period and a reception time period of the transceiver at a predetermined period;

signal processing means for converting an input signal into a compressed signal by compressing a time axis of said input signal by a predetermined ratio, and affixing said synchronizing signal to said compressed signal;

means for supplying said compressed signal with said synchronizing signal to said transmitting means during said transmission time period;

means for reproducing an original signal of a signals, transmitted from said another transceiver and received by said receiving means during said reception time period, by expanding a time axis of said signal by a predetermined ratio;

signal detecting means for detecting an absence/presence of said input signal and generating an output signal corresponding to said absence/presence; and control means for controlling operation of said signal processing means in accordance with said output signal of said signal detecting means;

wherein said control means controls the operation of said signal processing means to transmit only said synchronizing signal to said another transceiver when said signal detecting means generates said output signal representing an absence of said input signal for a predetermined time period.

2. A transceiver according to claim 1, wherein said signal detecting means generates said output signal representing an absence of said input signal when absence of said input signal is detected for at least one second.

3. A transceiver according to claim 1, wherein said control means controls a generation timing of said synchronizing signal so that a period of said synchronizing signal in an absence of said input signal is longer than a period of said synchronizing signal in a presence of said input signal.

4. A transceiver according to claim 1, wherein said predetermined ratio of said compressed signal is smaller than ½.

* * * * *